United States Patent
Kletti et al.

(10) Patent No.: US 12,479,557 B1
(45) Date of Patent: Nov. 25, 2025

(54) MARINE PROPULSION SYSTEM WITH PRE-CHARGE AND DISCHARGE CIRCUIT

(71) Applicant: Brunswick Corporation, Mettawa, IL (US)

(72) Inventors: Daniel R. Kletti, Juneau, WI (US); Jacob A. Yadon, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 90 days.

(21) Appl. No.: 18/392,213

(22) Filed: Dec. 21, 2023

Related U.S. Application Data

(60) Provisional application No. 63/478,665, filed on Jan. 5, 2023, provisional application No. 63/435,931, filed on Dec. 29, 2022.

(51) Int. Cl.
| | |
|---|---|
| *B63H 21/17* | (2006.01) |
| *B63H 21/21* | (2006.01) |
| *H02J 7/00* | (2006.01) |
| *H02J 7/34* | (2006.01) |

(52) U.S. Cl.
CPC ............. *B63H 21/17* (2013.01); *B63H 21/21* (2013.01); *H02J 7/0045* (2013.01); *H02J 7/0063* (2013.01); *H02J 7/345* (2013.01)

(58) Field of Classification Search
CPC ..................................... H02J 7/14; B60L 1/00
USPC ........................................................ 307/9.1
See application file for complete search history.

(56) References Cited

U.S. PATENT DOCUMENTS

| | | | |
|---|---|---|---|
| 3,315,631 | A | 4/1967 | Bass |
| 4,631,470 | A | 12/1986 | Bingley |
| 4,789,135 | A | 12/1988 | Watanabe |
| 4,868,706 | A | 9/1989 | Zaderej |
| 5,491,399 | A | 2/1996 | Gregory et al. |
| D402,872 | S | 12/1998 | Clowers et al. |
| 5,914,542 | A | 6/1999 | Weimer et al. |

(Continued)

FOREIGN PATENT DOCUMENTS

| | | |
|---|---|---|
| CN | 202084968 U | 12/2011 |
| DE | 10235431 A1 | 2/2004 |

(Continued)

*Primary Examiner* — Michael R. Fin
(74) *Attorney, Agent, or Firm* — Andrus Intellectual Property Law, LLP

(57) ABSTRACT

A marine propulsion system includes an electric marine drive comprising an electric motor powered by a power storage system, a link capacitor connected to the electric motor in parallel with the power storage system, and a high current switch positioned in a main current path between the power storage system and the electric motor and configured to have an on state that allows sufficient current to flow from the power storage system to power the electric motor and an off state that blocks bidirectional current flow along the main current path. A current limiting circuit is positioned in parallel with the high current switch and is configured to provide a controlled current to charge the link capacitor while the high current switch remains in the off state and may also be configured to control current flow from the link capacitor to the power storage system to recover power from the link capacitor while the high current switch remains in the off state.

20 Claims, 10 Drawing Sheets

(56) References Cited

U.S. PATENT DOCUMENTS

| | | | |
|---|---|---|---|
| D417,648 S | 12/1999 | Clowers et al. | |
| 5,998,977 A | 12/1999 | Hsu et al. | |
| 6,093,975 A | 7/2000 | Peticolas | |
| 6,515,880 B1 | 2/2003 | Evans et al. | |
| 6,628,107 B1 | 9/2003 | Bang et al. | |
| 6,882,129 B2 | 4/2005 | Boskovitch et al. | |
| 6,958,550 B2 | 10/2005 | Gilbreth et al. | |
| 7,202,576 B1 | 4/2007 | Dechene et al. | |
| 7,230,395 B2 | 6/2007 | Horii | |
| 7,518,348 B1 * | 4/2009 | Kobayashi | H02M 3/156 323/284 |
| 8,293,414 B2 | 10/2012 | Aoyagi et al. | |
| 8,337,264 B2 * | 12/2012 | Boebel | B63H 20/007 440/6 |
| 9,573,474 B2 | 2/2017 | Mensah-Brown et al. | |
| 9,925,878 B2 * | 3/2018 | Hashim | B60L 15/08 |
| 2005/0057215 A1 | 3/2005 | Matan | |
| 2006/0050541 A1 | 3/2006 | Terdan | |
| 2009/0140702 A1 | 6/2009 | Schulte et al. | |
| 2022/0368217 A1 * | 11/2022 | Hiruma | H02M 1/36 |

FOREIGN PATENT DOCUMENTS

| | | |
|---|---|---|
| DE | 10244808 A1 | 4/2004 |
| EP | 1089372 A1 | 4/2001 |
| JP | 2006129572 A | 5/2006 |
| JP | 2007116773 A | 5/2007 |
| RU | 2006170 C1 | 1/1994 |
| RU | 2289879 | 12/2006 |

* cited by examiner

MARINE PROPULSION SYSTEM WITH PRE-CHARGE AND DISCHARGE CIRCUIT

CROSS REFERENCE TO RELATED APPLICATIONS

This application claims benefit of priority to U.S. Provisional Application No. 63/435,931, filed Dec. 29, 2022, and U.S. Provisional Application No. 63/478,665, filed Jan. 5, 2023, the contents of which are hereby incorporated by reference in their entireties.

FIELD

The present disclosure generally relates to marine propulsion systems, and more particularly to electric marine propulsion systems having electric motors and methods for controlling current flow upon connection and disconnection of the battery to the marine drive.

BACKGROUND

Electric propulsion systems comprising an electric motor rotating a propeller are known. For example, on-board electric drive systems and outboard electric drive systems have been developed for propelling marine vessels. Different power supply arrangements for powering electric propulsion systems are also known. Such power storage systems include one or more batteries or banks of batteries, and or may include other power storage devices such as one or more ultracapacitors, fuel cells, flow batteries, and/or other devices capable of storing and outputting electric energy.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the present disclosure, a marine propulsion system includes an electric marine drive comprising an electric motor powered by a power storage system, a link capacitor connected to the electric motor in parallel with the power storage system, and a high current switch positioned in a main current path between the power storage system and the electric motor and configured to have on state that allows sufficient current to flow from the power storage system to power the electric motor and an off state that blocks bidirectional current flow along the main current path. A current limiting circuit is positioned in parallel with the high current switch, wherein the current limiting circuit is configured to provide a controlled current to charge the link capacitor while the high current switch remains in the off state, and wherein the current limiting circuit comprises an inductor between the power storage system and the link capacitor and two MOSFET switches configured to provide alternate current paths to the inductor.

In some embodiments, the current limiting circuit is also configured to control current flow from the power storage system to charge the link capacitor while the high current switch remains in the off state and to control current flow from the link capacitor to the power storage system to recover power from the link capacitor while the high current switch remains in the off state.

In another aspect of the present disclosure, a marine propulsion system includes an electric marine drive comprising an electric motor configured to be powered by a power storage system providing a DC current, a link capacitor connected to the electric motor in parallel with the power storage system, and a high current switch positioned in a main current path between the power storage system and the electric motor configured to have on state that allows sufficient current to flow from the power storage system to power the electric motor and an off state that blocks bidirectional current flow along the main current path. A current limiting circuit is positioned in parallel with the high current switch, wherein the current limiting circuit is configured to control current flow from the power storage system to charge the link capacitor while the high current switch remains in the off state and to control current flow from the link capacitor to the power storage system to recover power from the link capacitor while the high current switch remains in the off state.

In some embodiments, the current limiting circuit is also configured to provide a controlled current to charge the link capacitor while the high current switch remains in the off state, and wherein the current limiting circuit comprises an inductor between the power storage system and the link capacitor and two MOSFET switches configured to provide alternate current paths to the inductor.

In another aspect of the present disclosure, a method of controlling pre-charge and discharge of a link capacitor in parallel with a power storage system connected to an electric motor in an electric marine drive includes, upon detecting connection of the power storage system to the electric marine drive, controlling a current limiting circuit to charge the link capacitor from the power storage system while a high current power switch is in the off state preventing high current flow between the power storage system and the electric motor. Then, upon detecting a discharge activation condition, controlling the current limiting circuit to discharge the link capacitor to the power storage system while the high current power switch is in the off state.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
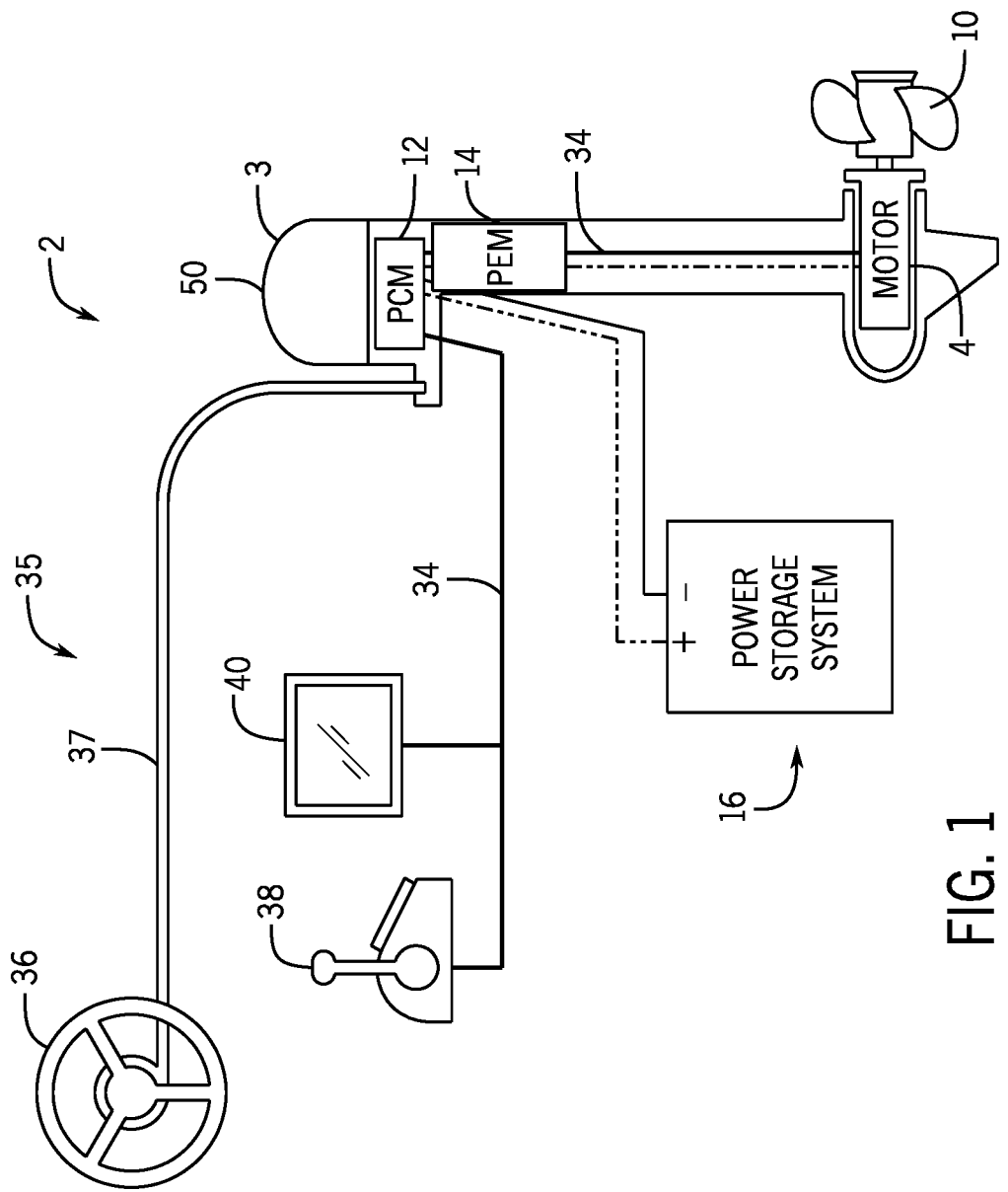
FIG. 1 is an exemplary electric marine propulsion system in accordance with the present disclosure.

The present inventors have recognized that a voltage filtering circuit is needed for filtering the voltage from the power storage system, such as a battery or bank of batteries, and the powered marine drive, particularly the electric motor. The inventors have designed the disclosed system comprising a large capacitance as a load-balancing energy storage device. A DC link capacitor, which may be a bank of capacitors, is placed between the DC power storage system (e.g., a battery or bank of batteries) and the motor. The link capacitor is placed parallel to the battery to maintain a consistent voltage across the motor inverter to protect against momentary voltage spikes, surges, and electromagnetic interference.

However, the inventors have recognized that system is needed to control the current between the power storage system and the link capacitor to pre-charge the link capacitor before the motor begins drawing power. Connecting a battery to an uncharged capacitor bank leads to very high currents, such as hundreds or thousands of amps, limited only by the resistance of the connection wiring and internal impedance of the battery. If the connection is made via mechanical means, such as a relay or contactor, there will likely be arcing and welding of the contacts. Even where a transistor switch is used, such as comprising one or more MOSFETs, the current inrush is undesirable and can have negative effects on the marine drive, the battery, or other system components (including the MOSFETs themselves) that are not designed to tolerate such high current flow.

The inventors have developed this disclosed power entry module that controls current flow from the power storage system to the link capacitor during a pre-charge process. The pre-charge circuit provides a parallel path to the primary high-current switch to charge the link capacitor to functionally the same voltage as the battery voltage before closing the primary high-current switch. This parallel path contains a current limiting circuit, which limits current to a much lower level than would flow through the high current switch if it were closed when the link capacitor is first connected to the power storage system. The current limiting circuit also limits the current to a level that is lower current than is typically needed to operate the motor. Thereby, even when a peak current is delivered, the motor will not turn. Thus, there is a period where the high current switch remains open while the link capacitor is charged. Once the link capacitor is at the same voltage as the battery, the high current switch can be closed without a high inrush current. With the high current switch closed, the motor can draw normal operating current, uninhibited by the current limit circuit. The parallel current limiting circuit can then be disabled to ensure all motor current flows through the high current switch.

The inventors have further recognized that it is desirable to recover some or all of the energy stored in the link capacitor, which not only conserves energy but also reduces or prevents the undesirable heat emissions generated when the link capacitor is dissipated (e.g., through a resistor or by other means). Accordingly, the inventors have designed the disclosed current limiting circuit to enable transferring the energy stored in the link capacitor back to the power storage device. This can be performed whenever the link capacitor needs to be discharged—such as if the marine drive is turned off, if there is a fault condition requiring shut-down, if the cowl is opened or other touch-safe conditions are detected, or if the current limiting circuit is not able to properly charge the link capacitor—to recover the energy back into the power storage system and avoid generating excess heat. It also avoids the need for additional circuit elements to dissipate the link capacitor, such a bank of resistors. Thus, it provides size and cost reduction benefits, in addition to improved energy efficiency.

The disclosed current limiting circuit includes an inductor between the power storage system and the link capacitor and two MOSFET switches configured to provide alternate current paths to the inductor. A MOSFET driver controls activation of the two MOSFET switches based on current measurement from a current measurement circuit so as to provide a current output that is maintained within a predetermined current range. In some embodiments, the driver and two MOSFET switches are also configured to be operated to provide a current path from the inductor towards the power storage device to discharge the link capacitor and recover the energy therefrom. In one embodiment, a first one of the two MOSFET switches is an n-channel MOSFET switch activated and deactivated to control current flow for charging the link capacitor and the second one of the two MOSFET switches is an n-channel MOSFET activated and deactivated to control current flow for discharging the link capacitor back to the power storage system. The MOSFET driver is configured to control each of the first and second MOSFET switches based on the measured current output to the link capacitor, thereby providing a varying current output that oscillates between a peak current and a minimum current. The period between the peak and minimum currents will vary throughout the process of charging or discharging the link capacitor, such as based on the relative charge level between the power storage system and the link capacitor.

FIG. 1 depicts an exemplary embodiment of an electric propulsion system 2 including at least one electric marine drive 3 having an electric motor 4 configured to propel the marine vessel by rotating a propeller 10. The electric motor 4 is powered by a power storage system 16. A user interface system 35 provides an interface between the user and the power storage system and the marine drive 3. In the depicted embodiment, the electric marine propulsion system 2 includes an outboard marine drive 3 having an electric motor 4 housed within a cowling 50, or enclosure, that gets mounted to the marine vessel, such as at the stern. A person of ordinary skill in the art will understand in view of the present disclosure that the marine propulsion system 2 may include other types of electric marine drives 3, such as inboard drives or stern drives, and any number thereof.

The electric marine propulsion system 2 may include one or a plurality of electric marine drives 3, each comprising at least one electric motor 4 configured to rotate a propulsor, or propeller 10. The motor may be located anywhere within the cowling, or may be housed on the marine vessel in non-outboard marine drives. Motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4. Various power storage devices and systems are known in the relevant art. The power storage system 16 may be a battery system that includes one or more batteries or banks of batteries of different varieties including OEM batteries, third party batteries, or both. For example, the power storage system 16 may include one or more lithium-ion (LI) battery systems, each LI battery comprised of multiple battery cells. In other embodiments, the power storage system 16 may include one or more lead-acid batteries, fuel cells, flow batteries, ultracapacitors, and/or other devices capable of storing and outputting electric energy, or any combination thereof.

The electric motor 4 is operably connected to the propeller 10 and configured to rotate the propeller 10. As will be known to the ordinary skilled person in the relevant art, the propeller 10 may include one or more propellers, impellers, or other propulsor devices, and that the term "propeller" may be used to refer to all such devices. In certain embodiments, the electric motor 4 may be connected and configured to rotate the propeller 10 through a gear system or a transmission. Various gear systems, or transmissions, are well known in the relevant art. In other embodiments, the electric motor 4 may directly connect to the propeller shaft such that rotation of the drive shaft is directly transmitted to the propeller shaft 8 at a constant and fixed ratio.

A control system 11 controls the electric marine propulsion system 2, wherein the control system 11 may include a plurality of control devices configured to cooperate to provide the method of controlling the electric marine propulsion system described herein. For example, the control system 11 may include a central controller 12 (illustrated here as a propulsion control module PCM), and one or more motor controllers, trim controllers, steering controllers, etc. communicatively connected, such as by a communication bus or other communication link. The control system 11 may also include one or more battery controllers associated with the power storage system 16 and/or one or more motor controllers configured to control the motor 4, which may be communicatively connected, directly or indirectly, to the central controller 12. Communication link 34, such as a CAN bus, facilitates communication between various devices and controllers within the system 11.

Each electric motor 4 may be associated with a motor controller (not shown) configured to control power to the electric motor, such as to the stator winding thereof. The motor controller is configured to control the function and output of the electric motor 4, such as controlling the torque outputted by the motor 4, the rotational speed of the motor 4, as well as the input current, voltage, and power supplied to and utilized by the motor 4. In one arrangement, the motor controller controls the current delivered to the stator windings via the leads, which input electrical energy to the electric motor 4 to induce and control rotation of the rotor.

A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected. Each controller may comprise a processor and a storage device, or memory, configured to store software and/or data utilized for controlling and/or tracking operation of the electric propulsion system 2. The memory may include volatile and/or non-volatile systems and may include removable and/or non-removable media implemented in any method or technology for storing information. The storage media may include non-transitory and/or transitory storage media, including random access memory, read only memory, or any other medium which can be used to store information and be accessed by an instruction execution system, for example. Such information may include a command table containing a set of adjustment commands based on measured or calculated values. An input/output (I/O) system facilitates communication between control system 11 and connected devices.

The controller 12 also receives input from and/or communicates with one or more user interface devices in the user interface system 35 via the communication link, which in some embodiments may be the same communication link as utilized for communication between the controller(s) 12 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin. A steering wheel 36 is provided, which in some embodiments may communicate with the controller 12 or other control device in the control system 11 to effectuate steering control over the marine drive 3, which is well-known and typically referred to as a steer-by-wire arrangement. Alternatively, as in the depicted embodiment, the steering wheel 36 is a wired steering arrangement where the steering wheel 36 is connected to a steering actuator that steers the marine drive 3 by a steering cable 37. Other steering arrangements, such as various wired and steer-by-wire arrangements, are well-known in the art and could alternatively be implemented.

The control system 11 may be configured to receive and communicate sensor data or sensed information from a plurality of sensors. Such sensed information may include input voltage to the electric motor 4, input current to the electric motor 4, motor RPM, marine vessel speed, etc. Such sensed information may also include information about the power storage system 16, such as voltage level, state of charge, state of health, temperature, etc. of each of one or more batteries in the system 16.

Figure 2:
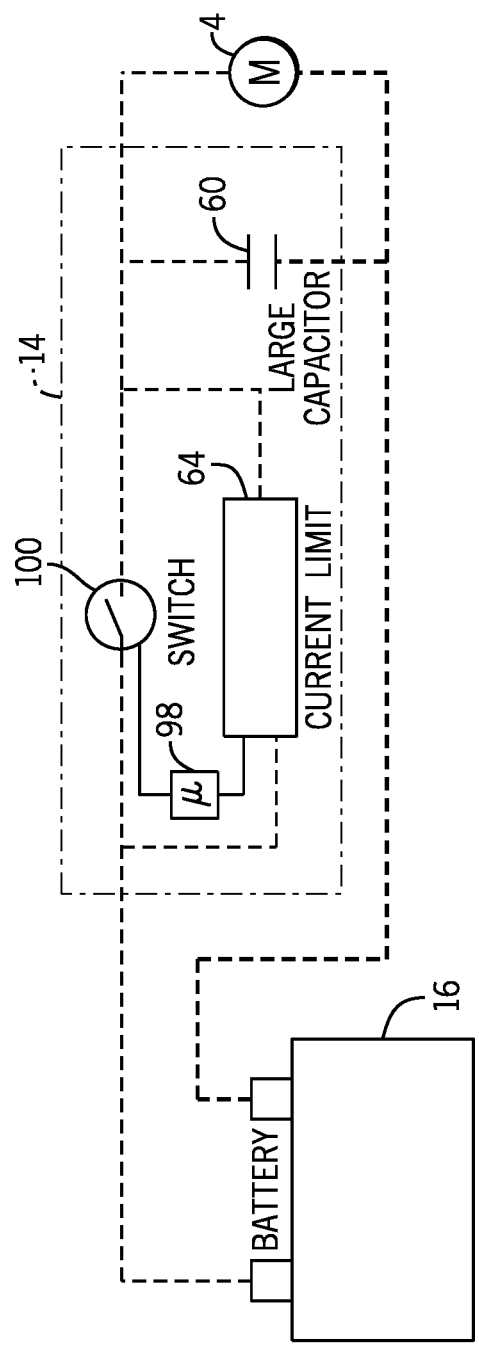
FIG. 2 schematically represents an exemplary power entry module in an electric marine propulsion system.

The marine propulsion system 2 also includes a power entry module (PEM) 14 configured to filter the voltage and loads between the power storage system 16 and the motor 4 to maintain a consistent voltage across the motor inverter and minimize EMI and radiated emissions. Referring also to FIG. 2, the PEM 14 is positioned between the power storage system 16 and the motor 4 and contains a DC link capacitor 60 to provide the above-described filtering. The link capacitor 60 may be a single capacitive element or may be a plurality of capacitive elements, or a capacitor bank, and is sized appropriately depending on the capacity of the power storage system 16 and the requirements of the motor. To provide one illustrative example, the link capacitor 60 for a 48 volt power storage system 16 may be in the range of 6k-12k μF. In some embodiments where the link capacitor 60 comprises the sum of multiple capacitors, at least a portion of the capacitors may be placed physically close to the motor/inverter to reduce the impedance between the two, and thus maximize the effectiveness of the capacitor(s). Additional capacitors comprising part of the link capacitor 60 may be placed at strategic locations for similar reasons, such as close to the location where they are needed.

The PEM 14 includes a current limiting circuit 64 configured to control current flow from the power storage system to the link capacitor 60 during a pre-charge process.

Figure 6:
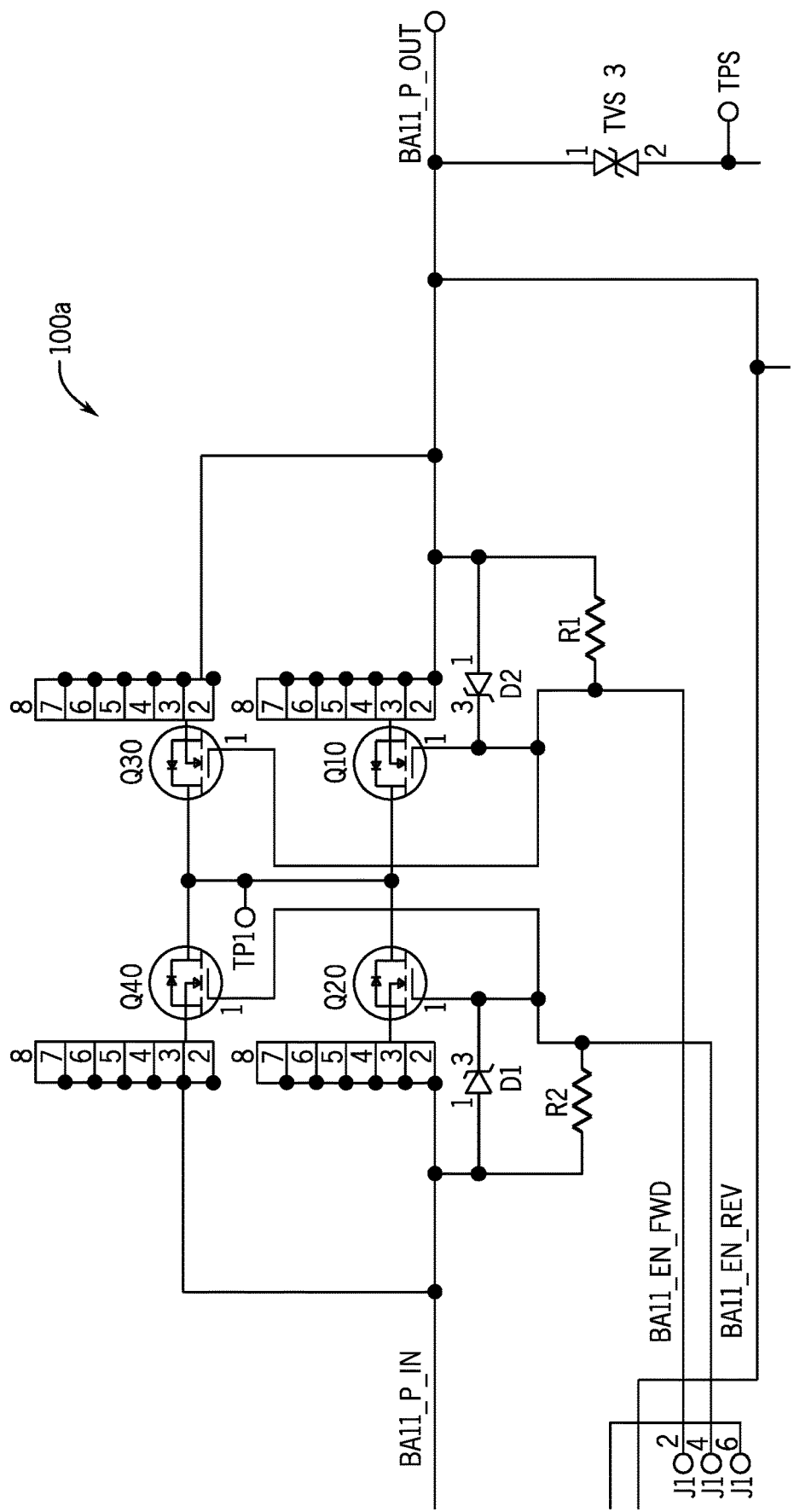
FIG. 6 is a circuit diagram of an exemplary high current switch of a power entry module, the high current switch comprising four MOSFETs.

The current limiting circuit is positioned in parallel with a high current switch 100. The high current switch is positioned in a main current path between the power storage system 16 and the electric motor 4 and is configured to have an on state that allows sufficient current to flow from the battery to power the electric motor and an off state that blocks bidirectional current flow along the main current path. In preferred embodiments, the high current switch is an electronic switch, such as including one or more MOSFETs. An exemplary implementation of the high current switch is shown in FIG. 6. In other embodiments, the high current switch may be a BJT, and IGBT, a relay, or a contactor.

Whereas the high current switch 100 is configured to allow enough current flow from the power storage system 16 to power the motor 4, the current limiting circuit 64 is designed to enable relatively lower current flow and is configured to prohibit an inrush of current upon connection of the power storage system 16 to the link capacitor 60. The current limiting circuit 64 thus limits the current to a level that is lower than is typically needed to operate the motor and thus the motor will not turn when the peak current is delivered. The current limiting circuit 64 provides a path to charge the link capacitor 60 to functionally the same voltage as the power storage system 16 while the high current switch 100 is in the off state—i.e., preventing current flow from the battery to the link capacitor.

Upon connection of the power storage system 16 to the link capacitor 60 and motor 4, the high current switch 100 is open. Microprocessor 98 is configured to control the high current switch 100, maintaining it in the off state to block bidirectional current flow along the main current path. The microprocessor 98 also controls the current limiting circuit 64 to initiate the pre-charge process to charge the link capacitor 60. The current limiting circuit 64 limits current flow during the pre-charge period until the link capacitor is fully charged, such as to a voltage that is within a threshold of or a substantially equal voltage level as the power storage system 16 accounting for the voltage drop across the sense resistor, the MOSFET Q1 resistance and other parasitic resistances. As described in more detail below, the current limiting circuit 64 may be configured to provide a varying current that oscillates between a peak current and a minimum current. The peak current is less than is typically needed to operate the motor 4, such as less than a current threshold required to operate the motor, and the minimum current is less the peak current. The period between the peak current and the minimum current will vary during the pre-charge process based on the battery voltage and the relative charge level of the link capacitor 60.

Once the link capacitor 60 is fully charged, the high current switch 100 can be closed without a high inrush current. The microprocessor 98 commands the high current switch 100 to switch to the on state. With the high current switch 100 providing a path for higher current flow, the motor can draw normal operating current uninhibited by the current limiting circuit 64. The microprocessor may then disable the parallel current limiting circuit 64 to ensure all motor current flows through the high current switch 100.

The PEM 14 may be located anywhere on the vessel, including housed with or near the marine drive 3, housed with or near the power storage system 16, or separately housed at some location on the vessel. In the example of FIG. 1, the PEM 14 is housed in the outboard marine drive 3, under the cowl 50. This has the advantage over housing it with the power storage system 16 in that the power storage system 16, such as one or more batteries thereof, can be connected and disconnected and the PEM 14 remains in place for controlling inrush current and protecting the components of the marine drive 3.

Figure 3:
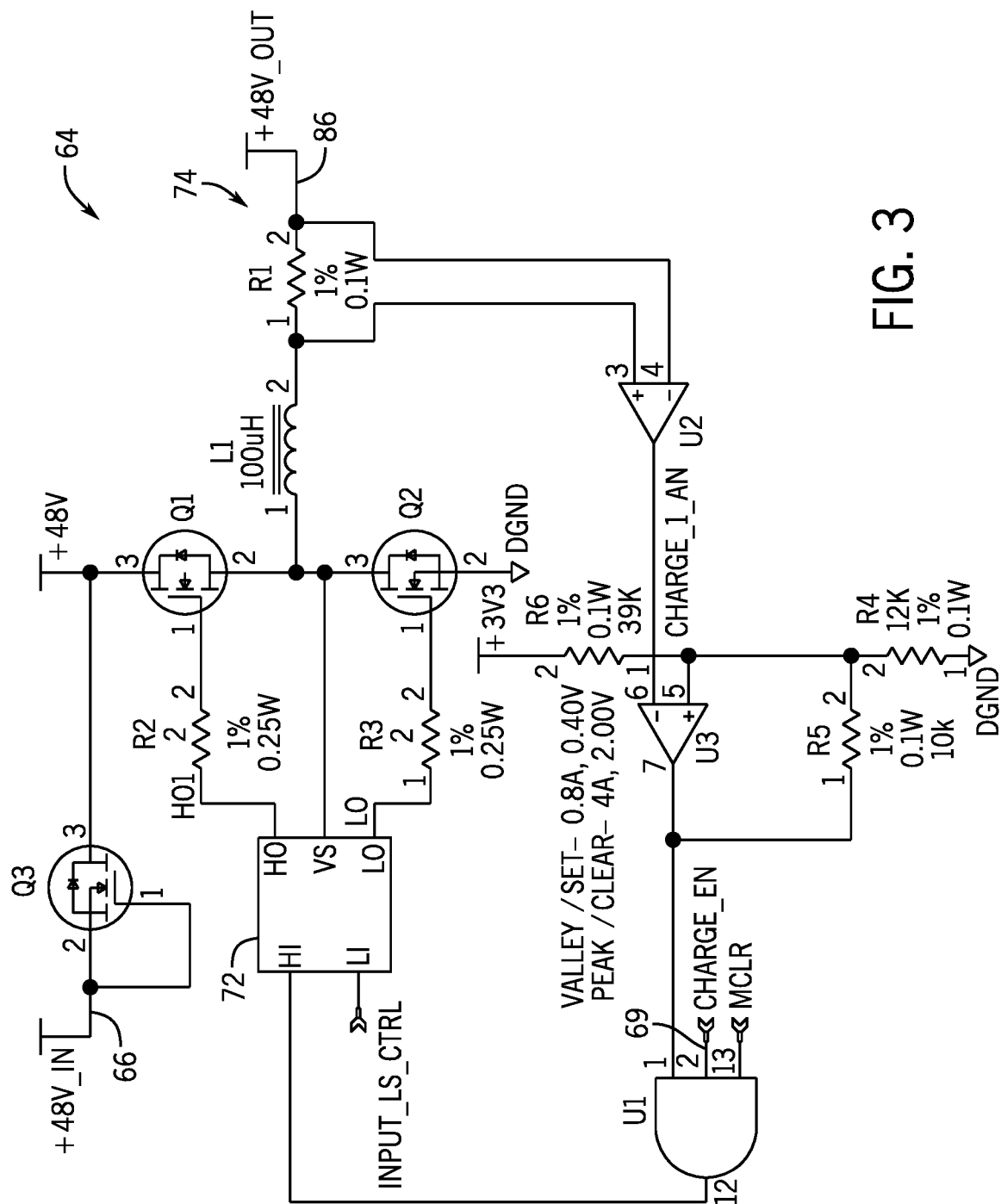
FIG. 3 is a circuit diagram of an exemplary current limiting circuit in a power entry module for an electric marine propulsion system.

FIG. 3 depicts one embodiment of a current limiting circuit 64 having an input 66 that is configured to receive current from the power storage system 16 and output 86 configured to provide current to the link capacitor 60 and motor 4. The current limiting circuit 64 comprises an inductor L1 and two MOSFET switches Q1 and Q2 configured to provide alternate current paths to the inductor, thereby providing the varying current to charge the link capacitor 60. In one embodiment, the two MOSFET switches Q1 and Q2 are each n-channel MOSFETS with built-in body diodes and controlled by a MOSFET driver 72. The current limiting circuit 64 is configured to control the first MOSFET switch Q1 to maintain the current output between the minimum current value and the peak current. When the microprocessor 98 detects a voltage indicating connection of a power storage system 16, it provides a charge enable signal on input 69 to gate U1 to enable the current limiting circuit 64. Since the charging current is initially zero, the comparator output from U3 is high and thus the output from gate U1 (which is an AND gate) will be high once the charge enable signal is first received. The reset signal MCLR also needs to be high.

The high output from gate U1 is provided to the MOSFET driver 72, which in turn enables the first MOSFET switch Q1. This causes the input current from the power storage system 16 to flow through the MOSFET switch Q3, and more specifically through the forward-biased body diode of Q3 while the MOSFET Q3 remains disabled, and through the enabled Q1 to the inductor L1 to begin charging the link capacitor 60. The current through the inductor L1 will ramp up, which is sensed by the current sensing circuit 74. The current sensing circuit 74 includes current sense resistor R1 and the operational amplifier U2, which is a current sense amp that outputs a value that is proportional to the voltage across the resistor R1, with a gain that is defined by the selected op-amp utilized as U2. U2 output voltage is also proportional to the current through R1 (U2 output voltage= (U2 gain)×(Current through R1)×(R1 resistance)). As the sensed current output increases, the output of the current sense amp U2 increases, which is provided as input to the comparator U3. Once the input to the comparator U3 reaches the threshold set by resistors R4, R5, and R6, then the comparator U3 outputs a low value, which is provided to gate U1. The low input to pin 1 of gate U1 causes the output of gate U1 to be low, thus signaling the MOSFET driver 72 to disable the first MOSFET Q1.

When the first MOSFET Q1 is disabled, the inductor L1 will continue to provide the stored energy to the link capacitor 60 via output 86. During this phase of the cycle, the current flows from ground through MOSFET switch Q2, and more particularly through the body diode thereof while Q2 remains disabled. As the stored energy in the inductor L1 is depleted, the sensed current by the current sensing circuit 74 will continue to decrease. Once the current falls to the low threshold of the comparator U3, which is set by resistors R4, R5, and R6, the comparator U3 output switches to high. Pin 1 on gate U1 thus becomes high and the above-described process starts over. When the output of U3 is high, R5 pulls up the sense node pin 5 of U3 (R5 is effectively in parallel with R6 in this case, both pulling up toward the upper threshold voltage). When the output of U3 is low, R5 pulls down the sense node pin 5 of U3 (R5 is effectively in parallel with R4 in this case, both pulling down toward 0V). This provides two distinct voltage levels at the sense node pin 5 of U3. These two voltages provide the hysteresis—i.e., when Charge_I_AN is rising, the voltage at which U3 output toggles is higher than when Charge_I_AN is falling.

Figure 4:
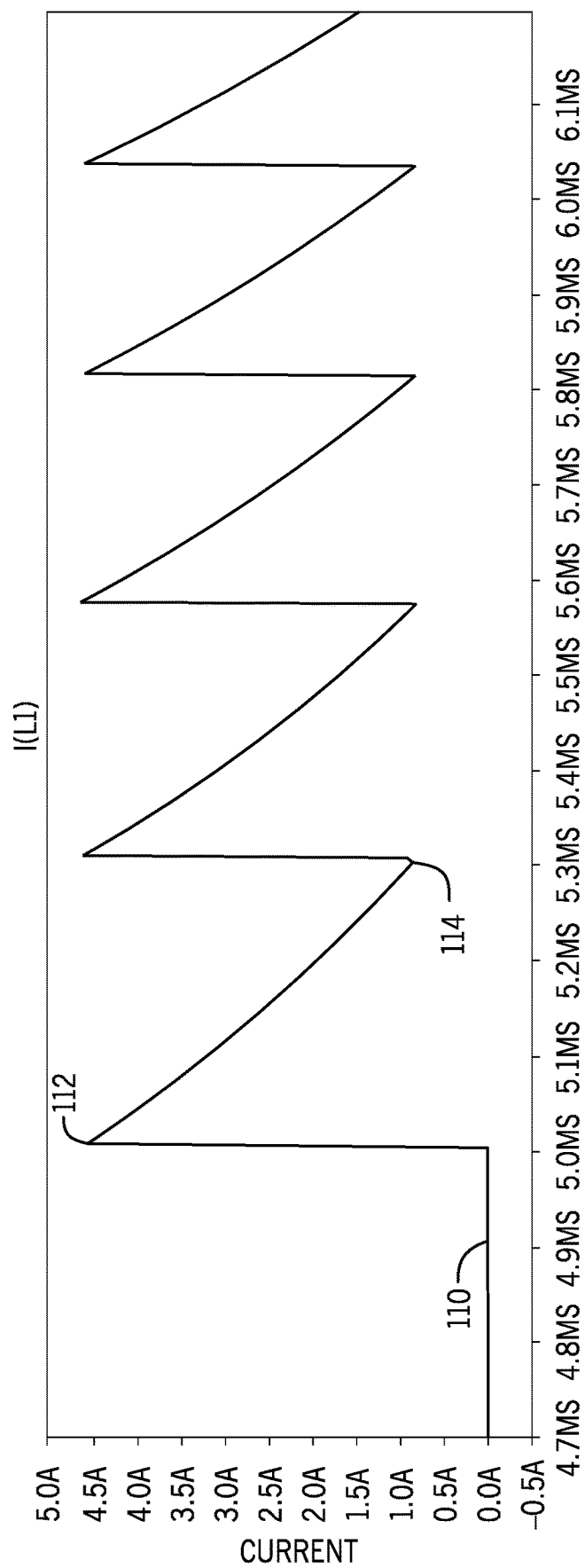
FIGS. 4-5 depict a varying current delivered by the current limiting circuit of FIG. 3 during a pre-charge process for charging a link capacitor.

FIG. 4 depicts an exemplary varying current output from the current limiting circuit 64. The current output represented by line 110 starts at zero and, upon connection of the power storage system 16 and activation of the current limiting circuit, varies between a minimum current value 114 of about 0.8 Amps and a peak current value 112 of about 4 Amps. The current increase portion of the varying current cycle is when the MOSFET Q1 is enabled and the peak current value is set by the value of the resistors R4, R5 and R6. The current decrease portion of the varying current cycle is when the MOSFET Q1 is disabled and the minimum current value is set by the value of the resistors R4-R6.

The frequency of the varying current cycle between the minimum current value 114 and the peak current value 112 is not specifically controlled by the circuit and will naturally vary as the voltage of the link capacitor 60 changes relative to that of the power storage system 16. Namely, the frequency first increases until the output has charged the link capacitor 60 to about 50% of the voltage level of the power storage system 16. The frequency then decreases until the output has charged to 100% and the current limiting circuit 64 is then disabled.

Figure 5:
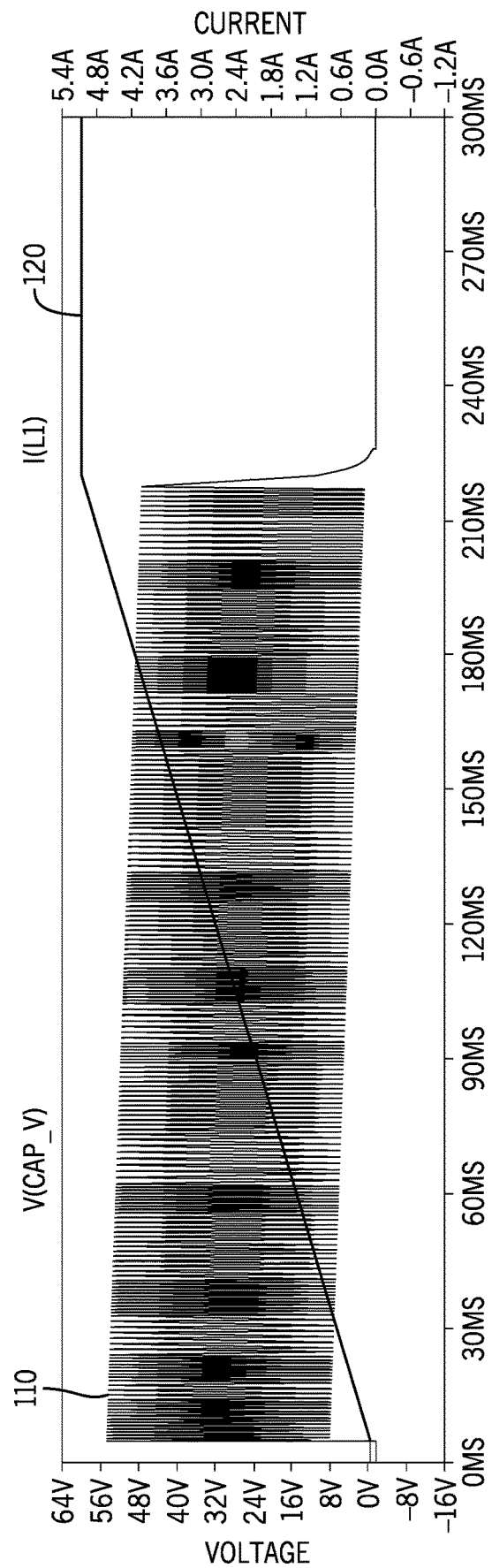

FIG. 5 is a graph depicting an exemplary process of charging the link capacitor 60 up to the fully charged state where the voltage is close to substantially equal to that of the power storage system 16, accounting for the voltage drop across the sense resistor, the MOSFET Q1/Q2 resistance, and other parasitic resistances. In some embodiments, the microprocessor 98 may be configured to continue operating the current limiting circuit 64 with the high current switch 100 in the off state until the voltage across the link capacitor 60 is within a threshold of the power storage system voltage. In the depicted example, the power storage system 16 has a voltage of about 60 volts, and thus the link capacitor 60 is fully charged once its voltage reaches just below 60 volts. As will be understood by a person of ordinary skill in the art, the threshold for the link capacitor 60 being fully charged will vary depending on the voltage of the power storage system being used. In other embodiments, the threshold may be further below the voltage of the power storage system 16, for example, to a threshold voltage that is less than the power storage system voltage but will not cause a problematic inrush of current when the high current switch 100 is closed.

As shown by line 110, the current varies between the minimum and peak current values to deliver the varying charge current to the link capacitor 60. Once the voltage of the link capacitor 60, represented by line 120, reaches the threshold, the microprocessor 98 will close the high current switch 100. It may also disable the current limiting circuit 64, which will then return to zero current flow as shown in the graph. The microprocessor 98 is thus configured to receive an input voltage measurement representing the power storage system 16 voltage level, and to receive a voltage measurement of the link capacitor 60.

FIG. 6 exemplifies one embodiment of a high current switch 100a, which here is formed by four high current MOSFETS Q10, Q20, Q30, and Q40. The MOSFETS Q10, Q20, Q30, and Q40 are controlled by the microprocessor 98 such that they are enabled, thus putting the high current switch 100a in an on state that allows sufficient current to flow from the battery to power the electric motor 4. The high current switch arrangement depicted here is desirable to prevent a short circuit of the battery in the case where the battery cables are inadvertently swapped when connecting them to the PEM. The MOSFET switches are arranged such that the body diodes do not permit current to flow in either direction when the MOSFETS are disabled, thus preventing a short circuit from occurring. Q10 and Q30 are configured to block current in the forward direction (from the power storage system to the link capacitor and motor) when they are off, and Q20 and Q40 are configured to block current in the reverse direction (from link capacitor and motor back to the power storage system) when they are off. When all 4 MOSFETs are turned on, current can flow bidirectionally. Q30 and Q40 are placed in parallel with Q10 and Q20, to provide a parallel path for the high current, and thus reduce the power dissipation due to the internal resistances of the MOSFETs.

Figure 7:
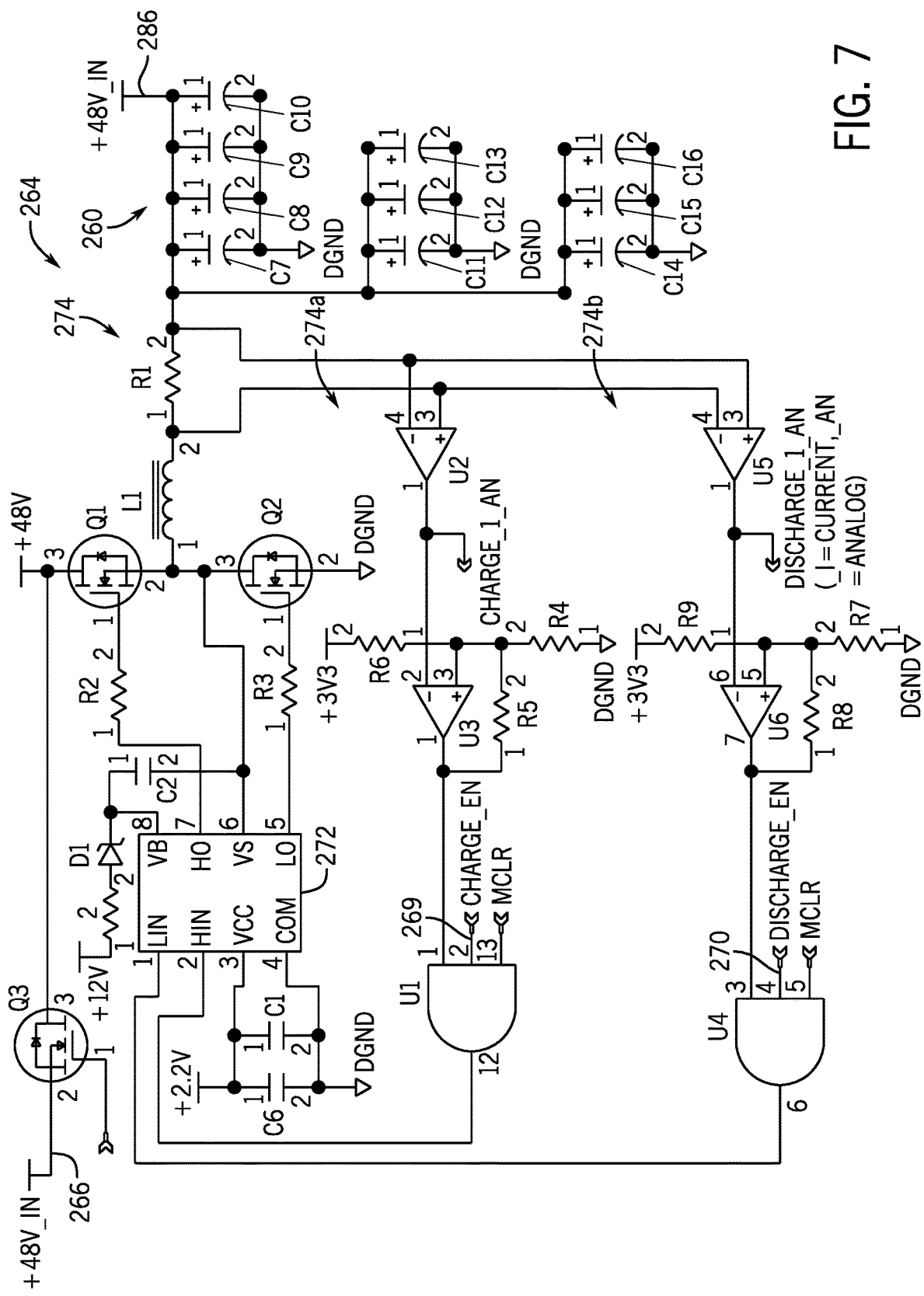
FIG. 7 is a circuit diagram of another exemplary current limiting circuit in a power entry module for an electric marine propulsion system.

FIG. 7 depicts one embodiment of a current limiting circuit 264 adapted for both charging and discharging the link capacitor 60, 260 between an input 266 configured to receive current from the power storage system 16 and output 286 configured to provide current to the motor 4. Here, the link capacitor 260 is shown as a capacitor bank comprising ten capacitors (each being a 510 µF, 100 V capacitor) arranged in parallel. The current limiting circuit 264 includes the same inductor L1 and arrangement of first and second MOSFET switches Q1 and Q2 described above with respect to FIG. 3. The configuration of the op-amp U2, comparator U3, and gate U1 to turn on and off the first MOSFET switch Q1 based on the current through resistor R1 to control charge current output to the link capacitor 260 is described above.

The MOSFET driver 272 is configured to control on/off activation of both Q1 and Q2. The output of gate U1 is provided as a "high enable/disable" signal the MOSFET driver 272 instructing it to switch Q1 to the on state or the off state to control current output during the charging process. A similar current sensing and gate arrangement—including op-amp U5, comparator U6, and gate U4—is also provided to control current flow during the discharge process. The third MOSFET switch Q3 is positioned at the input 266 is configured to prevent the flow of current back toward the power storage system 16 unless it is enabled, and thus Q3 remains disabled during the charging process and gets enabled during the discharge process.

The process for charging the link capacitor 260 is described above with respect to FIGS. 3-5. Once a discharge condition is detected requiring that the link capacitor 60, 260 be discharged, the microprocessor 98 (FIG. 2) turns off the charge enable signal on input 269 to gate U1 to disable the charge function of the current limiting circuit 264. The microprocessor 98 also provides a discharge enable signal on input 270 of gate U4 to enable the discharge function of the current limiting circuit 264. Note that gate U4 may be provided with gate U1 in a single physical device configured to provide two AND gates or may be a separate device. The third MOSFET switch Q3 is also enabled, which allows current to flow out of the current limiting circuit 264 back to the power storage system 16. The current sensing circuit 274 is configured to measure current in both directions. Here, the current sensing circuit 274 includes a first section 274a configured to measure current flow across resistor R1 in the direction toward the link capacitor 260 (used during the charging process) and a second section 274b configured to measure current flow across resistor R1 in the opposite direction (used during the discharge process).

In the discharge mode, the current limiting circuit 264 acts as a boost circuit to push the energy back into the battery. Q1 acts as a rectifier and Q2 gets turned on and off to drive the current from the link capacitor 260 through L1 and back to the power storage system 16. When Q2 is switched on, current will flow from the link capacitor 260 to charge up the inductor L1. Once a threshold current is detected in by the current sensing circuit 274, the output of U4 switches to low. The low output of U4 is provided to the corresponding input pin (shown here as pin 1) of the MOSFET driver 272, which is configured to then switch the second MOSFET Q2 to the off state. Current then flows from the charged inductor L1 through the body diode of Q1 and through the enabled MOSFET switch Q3 to the power storage system 16. When the first MOSFET Q1 is disabled, the inductor L1 will continue to provide the stored energy from the link capacitor 260 to the power storage system 266. During this phase of the cycle, the current flows from the DC link capacitors 260 through MOSFET switch Q1, and more particularly through the body diode thereof while Q2 remains disabled. As the stored energy in the inductor L1 is depleted, the sensed current by the current sensing circuit 274 will continue to decrease. Once the current falls to the low threshold of the comparator U6, which is set by resistors R7, R8, and R9, the comparator U4 output switches to high. The low input on MOSFET driver 272 thus becomes high and the above-described process starts over.

Figure 8:
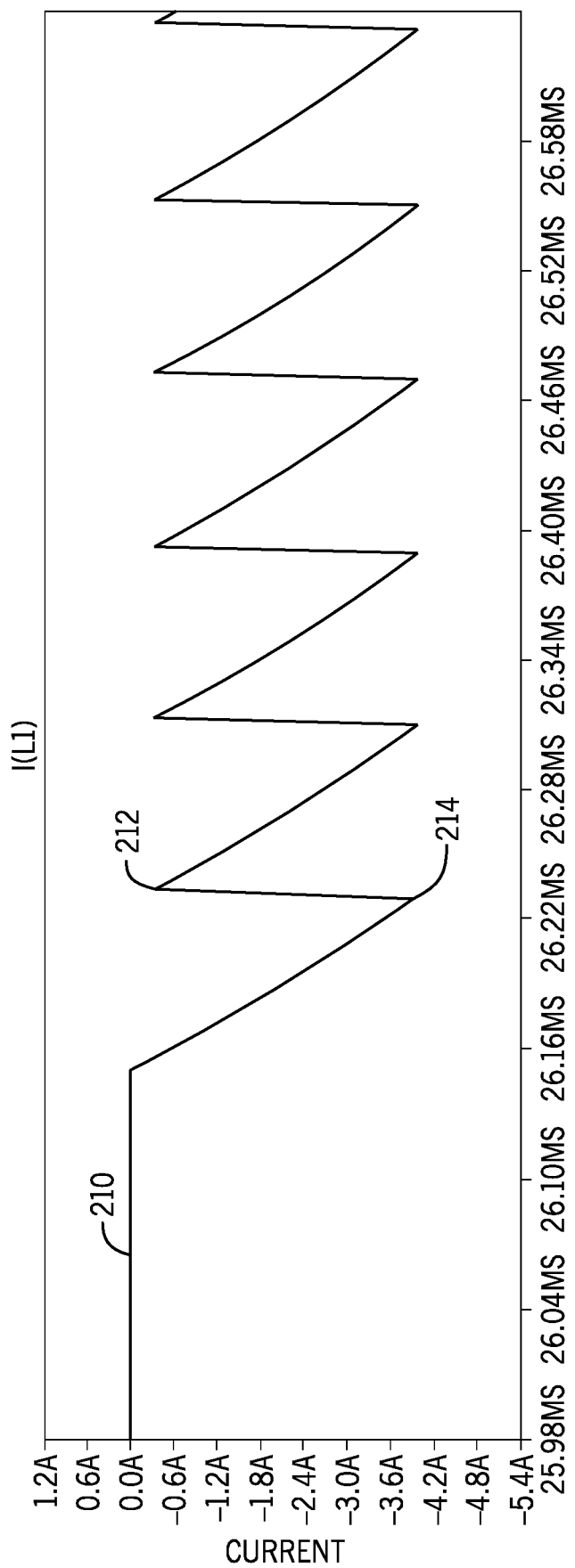
FIG. 8 depicts a varying current delivered by the current limiting circuit of FIG. 7 during a discharge process for discharging a link capacitor to recover the power stored therein.
Figure 9:
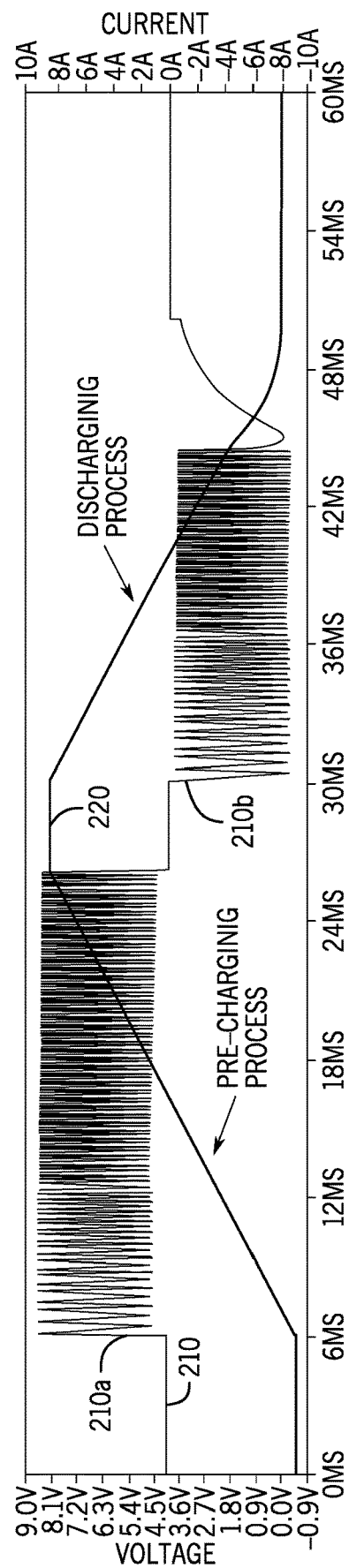
FIG. 9 depicts a varying current delivered by the current limiting circuit of FIG. 7 during a pre-charge process for charging the link capacitor followed by a discharge process for discharging the link capacitor.

FIG. 8 is a graph showing the varying current (line 210) over time, which varies between a maximum current value 212 (at or near zero) and a minimum current value 214 (negative indicating directional flow away from the link capacitor 260. The minimum and maximum current values 212 and 214 are set by the value of the resistors R7-R9 associated with the comparator U6. (FIG. 7). Referring also to FIG. 9, during the discharge process the current 210b varies between the maximum current value 212 and the minimum current value 214 until the voltage (represented by line 220) across the link capacitor 260 is sufficiently depleted such that it can no longer charge the inductor L1 sufficiently to drive current to the power storage system 16.

FIG. 9 illustrates a charge process where the link capacitor 260 is charged up from the power storage system 16, followed by a discharge process where the link capacitor 260 is discharged back to the power storage system 16. During the charging process, the current 210a varies between a first minimum and maximum and maximum current value. During the discharge process, the current 210b varies between a second minimum and maximum value where the current travels in the opposite direction than it does in the charging process. In some embodiments, the difference between the first minimum and maximum current values is approximately the same as the difference between the second minimum and maximum current values, and thus the magnitude of the current variation during the charging process approximately equal to the magnitude of the current variation during the discharging process. In other embodiments, the magnitude of the current variation during the charging process may differ from the magnitude of the current variation during the discharging process.

Figure 10:
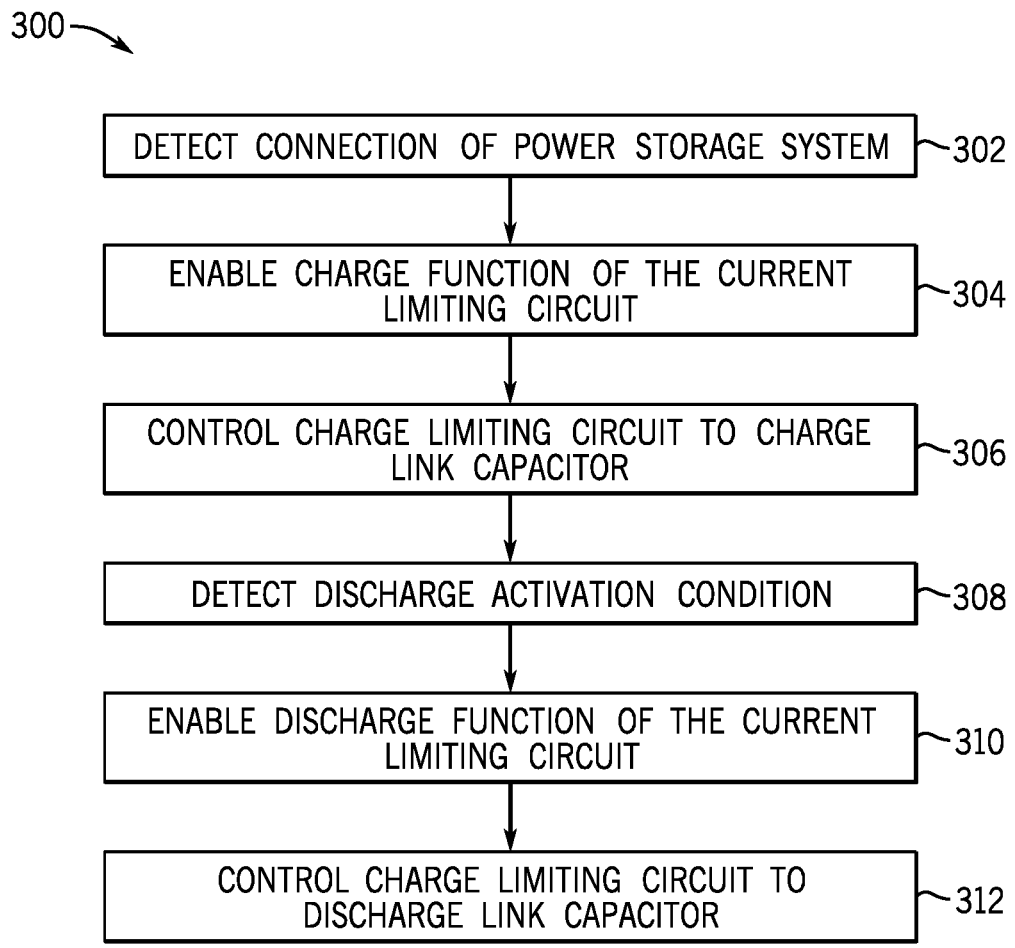
FIG. 10 depicts an exemplary method of controlling pre-charge and discharge of a link capacitor according to an embodiment of the present disclosure.

FIG. 10 depicts one embodiment of a method 300 of controlling pre-charge and discharge of a link capacitor 60, 260. Connection of the power storage system 16 is detected at step 302, such as based on an input voltage measurement at the input of the PEM 14 and/or at the input of the current limiting circuit 64, 264. The charge function of the current limiting circuit 64, 264 is then enabled at step 304. The current limiting circuit 64, 264 is then controlled at step 306 to deliver a limited current to the link capacitor 60, 260, charging it up to a voltage at or near that of the power storage system 16 while the high current switch remains in an off state. The high current switch 100, such as the MOSFET switch arrangement 100a described above, blocks bidirectional current flow along the main current path so that all current flowing to the link capacitor 60, 260 and motor 4 from the power storage system 16 is through the current limiting circuit 64, 264.

If the current limiting circuit 64, 264 is able to fully charge up the link capacitor 60, 260—e.g., to a voltage at or near that of the power storage system 16 such that an over-current condition cannot occur-then the high current switch 100 gets switched to the on state. This allows high current to flow from the power storage system 16 to power the motor 4, such as to meet the propulsion demand inputted by a user or an autonomous navigation controller. The microprocessor 98 may be configured to disable the current limiting circuit 64, 264, such as by providing a low input to both the charge enable input 69, 269 of gate U1 and to the discharge enable input 270 of gate U4. This will cause the MOSFET driver 72, 272 to switch the first and second MOSFETs Q1 and Q2 to the off state (if they are not already in the off state).

The PEM 14 may be configured to operate the current limiting circuit 64, 264 to charge the link capacitor 60, 260 for a predetermined maximum charge time or for up to a predetermined maximum charge time. In some embodiments, the microprocessor 98 may be configured to monitor the current input to the link capacitor 60, 260 (e.g., via current sensing circuit 74, 274) to or to measure the voltage across the link capacitor 60, 260 to assess whether the link capacitor 60, 260 has reached a charge threshold indicating that it is fully charged. For instance, the microprocessor 98 may start a timer upon sending the charge enable signal and may allow up to the predetermined maximum charge time to reach the charge threshold. Alternatively, the microprocessor 98 may be configured to operate the current limiting circuit 64, 264 for the predetermined maximum charge time regardless and to assess the charge level of the link capacitor 60, 260 thereafter to determine whether the charge threshold is reached and the high current switch 100, 100a can be switched to the on state. The predetermined maximum charge time is set to allow the link capacitor 60, 260 to fully charge during normal operation conditions and thus may account for the maximum expected voltage level of the power storage system, but also so that the responsiveness of the propulsion system is not substantially impaired. To provide one example, the predetermined maximum charge time for a 48V power storage system 16 may be around 500 ms, or may be between 250 ms and 1 second.

Once the threshold charge level is reached, then the link capacitor 60, 260 is deemed fully charged. The charge level of the link capacitor 60, 260 reaching the charge threshold may be assessed in various ways. For example, the charge threshold may be based on the current response as measured by the current sensing circuit 74, 274, such as the current peak value being reached in a sufficient time period. Alternatively, the charge threshold may be based on the voltage across the link capacitor 60, 260, such as a measured voltage reaching a threshold voltage in range of the power storage system 16 voltage.

If the current limiting circuit 64, 264 is unable to fully charge the link capacitor 60, 260—e.g., the threshold current and/or threshold voltage are not reached within the predetermined maximum charge time-then a discharge activation condition is detected requiring that the link capacitor 60, 260 be discharged. In embodiments where the current limiting circuit 64, 264 is configured to recover the energy from the link capacitor 60, 260, the discharge function is activated and the energy stored in the link capacitor 60, 260 is transferred to the power storage system 16. Alternatively or additionally, the control system 11, in conjunction with the PEM 14, may be configured to detect other discharge activation conditions. For example, discharge activation condition(s) may include the marine drive 3 being turned off, such as turned off by the user or disabled by the control system 11. Alternatively or additionally, the discharge activation condition(s) may include detection of one of a list of fault conditions relating to the electric motor 4 or other component of the marine drive 3 (such as a list of pre-identified critical fault conditions that prevent the motor 4 from being powered on). Alternatively or additionally, the discharge activation condition(s) may include detection of an open cowl or open battery housing, or any condition where voltage needs to be reduced to make the system touch-safe.

Once a discharge activation condition is detected, represented at step 308, then the discharge function of the current limiting circuit 264 is enabled at step 310. As described above with respect to the exemplary embodiment shown in FIG. 7, the microprocessor 98 engages the discharge process by sending the high signal to the discharge enable input 270 of the gate U4. The charge limiting circuit 264 is then controlled accordingly, where the MOSFET driver 272 controls the second MOSFET switch Q2 according to output from the current sensing circuit 274 to provide a varying current from the link capacitor 260 towards the power storage device 16 until the link capacitor is sufficiently discharged, such as to zero or a very low voltage that does not pose a shock hazard or other hazard to the system. Once the link capacitor 60, 260 has been fully discharged, the microprocessor may disable the discharge process by sending a low signal to input 270 of gate U4, which will result in both MOSFETS Q1 and Q2 being in the off state. MOSFET Q3 could also be turned off as well at this time, if desired, to again provide reverse polarity protection.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A marine propulsion system comprising:
an electric marine drive comprising an electric motor configured to be powered by a power storage system providing a DC current;
a link capacitor connected to the electric motor in parallel with the power storage system;
a high current switch positioned in a main current path between the power storage system and the electric motor and configured to have an on state that allows sufficient current to flow from the power storage system to power the electric motor and an off state that blocks bidirectional current flow along the main current path;
a current limiting circuit positioned in parallel with the high current switch, wherein the current limiting circuit is configured to provide a controlled current to charge the link capacitor while the high current switch remains in the off state, and wherein the current limiting circuit comprises an inductor between the power storage system and the link capacitor and two MOSFET switches configured to provide alternate current paths to the inductor; and
wherein the current limiting circuit is further configured to control current flow from the link capacitor back to the power storage system to recover power from the link capacitor while the high current switch remains in the off state.

2. The system of claim 1, further comprising a MOSFET driver configured control activation of the two MOSFET switches;
wherein two MOSFET switches include a first MOSFET switch and a second MOSFET switch, wherein the first MOSFET switch is oriented such that in its off state it prevents current flow from the power storage system to the inductor and wherein the second MOSFET switch is oriented such that in its off state it prevents current flow from the inductor to ground.

3. The system of claim 1, wherein the two MOSFET switches include a first MOSFET switch and a second MOSFET switch each controlled by a MOSFET driver;
wherein the MOSFET driver is configured to turn on and off the first MOSFET switch to control current flow from the power storage system to charge the link capacitor; and
wherein the MOSFET driver is configured to turn on and off the second MOSFET switch to control current flow from the link capacitor back to the power storage system to recover energy therefrom.

4. The system of claim 1, wherein the two MOSFET switches include a first MOSFET switch and a second MOSFET switch each controlled by a MOSFET driver;
wherein the circuit is configured such that the MOSFET driver turns on the second MOSFET switch to allow current to flow from the inductor to ground and turns off the second MOSFET switch to allow current to flow from the inductor through the first MOSFET switch toward the power storage system.

5. The system of claim 4, further comprising a third MOSFET switch oriented such that in its off state it prevents current flow from the current limiting circuit to the power storage system, and wherein the third MOSFET switch is configured to be turned on to enable the current to flow through the first MOSFET switch to the power storage system.

6. A marine propulsion system comprising:
an electric marine drive comprising an electric motor configured to be powered by a power storage system providing a DC current;
a link capacitor connected to the electric motor in parallel with the power storage system;
a high current switch positioned in a main current path between the power storage system and the electric motor configured to have on state that allows sufficient current to flow from the power storage system to power the electric motor and an off state that blocks bidirectional current flow along the main current path; and
a current limiting circuit positioned in parallel with the high current switch, wherein the current limiting circuit is configured to control current flow from the power storage system to charge the link capacitor while the high current switch remains in the off state and to control current flow from the link capacitor to the power storage system to recover power from the link capacitor while the high current switch remains in the off state.

7. The system of claim 6, wherein the current limiting circuit comprises a MOSFET driver configured control activation of two MOSFET switches providing alternate current paths to an inductor positioned between the power storage system and the link capacitor.

8. The system of claim 7, wherein two MOSFET switches include a first MOSFET switch and a second MOSFET switch, wherein the first MOSFET switch is oriented such that in its off state it prevents current flow from the power storage system to the inductor and wherein the second MOSFET switch is oriented such that in its off state it prevents current flow from the inductor to ground.

9. The system of claim 7, wherein the two MOSFET switches include a first MOSFET switch and a second MOSFET switch each controlled by a MOSFET driver;
wherein the MOSFET driver is configured to turn on and off the first MOSFET switch to control current flow from the power storage system to charge the link capacitor; and
wherein the MOSFET driver is configured to turn on and off the second MOSFET switch to control current flow from the link capacitor to the power storage system to recover energy therefrom.

10. The system of claim 7, wherein the two MOSFET switches include a first MOSFET switch and a second MOSFET switch each controlled by a MOSFET driver;
wherein the circuit is configured such that the MOSFET driver turns on the second MOSFET switch to allow current to flow from the inductor to ground and turns off the second MOSFET switch to allow current to flow from the inductor through the first MOSFET switch toward the power storage system.

11. The system of claim 10, further comprising a third MOSFET switch oriented such that in its off state it prevents current flow from the current limiting circuit to the power storage system, and wherein the third MOSFET switch is configured to be turned on to enable the current to flow through the first MOSFET switch to the power storage system.

12. The system of claim 10, wherein the MOSFET driver is configured to turn on the first MOSFET switch to allow current to flow to the inductor from the power storage system and turn off the first MOSFET switch to prevent current flow to the inductor from the power storage system; and
wherein when the MOSFET driver turns off the first MOSFET switch, current flows to the inductor through the second MOSFET switch.

13. The system of claim 6, wherein the current limiting circuit is configured to provide a varying current in both directions between the power storage system and the link capacitor, wherein the varying current varies between a peak current and a minimum current.

14. The system of claim 13, wherein a period between the peak current and the minimum current decreases as a voltage across the link capacitor increases.

15. A method of controlling pre-charge and discharge of a link capacitor in parallel with a power storage system connected to an electric motor in an electric marine drive, the method comprising:
upon detecting connection of the power storage system to the electric marine drive, controlling a current limiting circuit to charge the link capacitor from the power storage system while a high current power switch is in an off state preventing high current flow between the power storage system and the electric motor; and
upon detecting a discharge activation condition, controlling the current limiting circuit to discharge the link capacitor to the power storage system while the high current power switch is in the off state.

16. The method of claim 15, wherein the discharge activation condition includes turning off the marine drive.

17. The method of claim 15, wherein the discharge activation condition includes detection of a fault conditions relating to the electric motor.

18. The method of claim 15, wherein the discharge activation condition includes the link capacitor not reaching a charge threshold within a predetermined maximum charge time.

19. The method of claim 15, further comprising switching the high current switch to an on state once a voltage of the link capacitor is within a threshold of a voltage of the power storage system.

20. The method of claim 15, wherein controlling the current limiting circuit to charge the link capacitor includes alternately turning on and off a first MOSFET switch of the current limiting circuit to control charging the link capacitor from the power storage system; and
wherein controlling the current limiting circuit to discharge the link capacitor includes, alternately turning on and off a second MOSFET switch of the current limiting circuit to control discharging the link capacitor to the power storage system.

* * * * *